United States Patent
Nishiyama

(10) Patent No.: US 7,921,598 B2
(45) Date of Patent: Apr. 12, 2011

(54) GEL-COATED SEED

(75) Inventor: Yuugo Nishiyama, Hyogo (JP)

(73) Assignee: Agritecno Yazaki Co., Ltd., Hyogo (JP)

( * ) Notice: Subject to any disclaimer, the term of this patent is extended or adjusted under 35 U.S.C. 154(b) by 0 days.

(21) Appl. No.: 12/614,594

(22) Filed: Nov. 9, 2009

(65) Prior Publication Data

US 2010/0050507 A1 Mar. 4, 2010

Related U.S. Application Data

(63) Continuation of application No. 10/231,983, filed on Aug. 30, 2002, now abandoned.

(30) Foreign Application Priority Data

Sep. 7, 2001 (JP) ................................. 2001-271729

(51) Int. Cl.
*A01C 1/06* (2006.01)
(52) U.S. Cl. ....................................................... 47/57.6
(58) Field of Classification Search ................... 47/57.6; 504/100; 427/4
See application file for complete search history.

(56) References Cited

U.S. PATENT DOCUMENTS

| | | |
|---|---|---|
| 2,967,376 A | 1/1961 | Scott, Jr. |
| 4,715,143 A | 12/1987 | Redenbaugh et al. |
| 5,292,507 A | 3/1994 | Charley |
| 5,787,824 A | 8/1998 | Kohno |
| 5,791,084 A | 8/1998 | Kohno et al. |
| 5,830,576 A | 11/1998 | Mehra et al. |
| 6,119,395 A | 9/2000 | Hartle et al. |
| 2002/0011025 A1 | 1/2002 | Kohno et al. |
| 2003/0041511 A1 | 3/2003 | Nishiyama |
| 2003/0046865 A1 | 3/2003 | Nishiyama |

FOREIGN PATENT DOCUMENTS

| | | |
|---|---|---|
| DE | 943858 | 6/1956 |
| EP | 0740897 A | 11/1996 |
| EP | 0753244 A | 1/1997 |
| FR | 2469861 | 5/1981 |
| JP | 04235124 A | 5/1981 |
| JP | 062221439 A | 9/1987 |
| JP | 05-56707 | 3/1993 |
| WO | WO02/03964 A1 | 1/2002 |

OTHER PUBLICATIONS

English translation of JP5-056707, Dec. 2007.*
Anonymous. 1998. Merriam-Webster's Collegiate Dictionary, 10th ed., pp. 172, 732, 1119.

* cited by examiner

*Primary Examiner* — Son T. Nguyen
(74) *Attorney, Agent, or Firm* — Brinks Hofer Gilson & Lione

(57) ABSTRACT

A gel-coated seed is provided, which has sufficient strength for handling just after the production thereof and after the recovery following the storage under drying, and has a good property in terms of standing-up of seedling. The gel-coated seed includes: a seed of a plant; a coating gel-layer, which coats the seed, consisting of alginic acid-based aqueous gel gelled in the presence of a multivalent metal ion; and grains consisting of water-containing hydrophilic polymer, which is resistant to the multivalent metal ion, distributed in the coating gel-layer.

3 Claims, No Drawings

GEL-COATED SEED

BACKGROUND OF THE INVENTION (1) Field of the Invention

The present invention relates to a gel-coated seed.

(2) Description of the Related Art

The gel-coated seed technology (i.e., technology of coating seeds with gel) improves a conventional labor-intensive agriculture including excessive sowing in the field taking low gemmation rate of seeds into consideration, that is, taking the fact that the bud barely or hardly comes out from the coating gel-layer after the gel-coated seed germinates, and thinning out after gemmation.

The technology is an epoch-making technology, by which a seedling can securely be obtained from a grain of seed with the aid of water or other constituent contained in a coating gel-layer and furthermore a crop can be obtained. The technology enables the use of F1 seeds, which is excellent and very expensive, thereby attaining significant improvement in yield and quality. The technology is really good news for Japanese agriculture, which should survive in the condition that high quality and cheap vegetables and flowers are imported from neighboring Asian countries.

At the beginning, the coating gel-layer of the gel-coated seed was composed of only alginic acid-based aqueous gel. However, since the alginic acid-based aqueous gel is relatively hard, such a gel-coated seed had a problem in terms of "standing-up of seedling" (explained below). In other words, since the alginic acid-based aqueous gel is relatively hard, the bud of a coated plant may become difficult to grow or may not come out from the coating gel-layer to die. Consequently, such a measure has been employed that grains consisting of hydrophilic polymer and water are distributed in the coating gel-layer.

In this specification, the "standing-up of seedling" is defined as a condition that a gel-coated seed sown in a field germinates, the bud comes out from the coating gel-layer and further comes out from the soil of the field, and it becomes a defect-free plant body with the first leaf thereof being completely out (i.e., being completely extends). A ratio (%) of seeds, each of which has a good property in terms of "standing-up of seedling" described above, relatively to all seeds sown is called "ratio of standing-up of seedling" in this specification.

The gel-coated seed, in which grains consisting of water-containing hydrophilic polymer are distributed in the coating gel-layer consisting of alginic acid-based aqueous gel, is produced, for example, by the following manner.

A weighing is carried out so that the concentration of sodium alginate becomes 0.9 wt % and the final concentration of powdered starch polyacrylate-based hydrophilic polymer (i.e., starch-acrylic acid graft polymer) becomes 0.2 wt %, then water is added thereto so as to dissolve the sodium alginate sufficiently. At that time, the hydrophilic polymer absorbs water to be granular and is dispersed by stirring. By using this liquid dispersion (i.e., gel-forming liquid in which the grains consisting of the water-containing hydrophilic polymer are dispersed), a droplet thereof is formed at a lower end of a hollow tube, into which a seed is introduced from the interior of the hollow tube, and then the resultant droplet is dropped in a solution containing multivalent metal ion having concentration of 12-14 wt % such as an aqueous solution (hardening liquid) of calcium chloride, thereby obtaining a gel-coated seed including a coating gel-layer, which is insolubilized against water.

Since the strength of thus produced coating gel-layer is very strong, in order to attain a better property in terms of standing-up of seedling, a gel-coated seed having low concentration of alginate has been produced, by which a three-dimensional network structure obstructing the growth of the seed due to the alginic acid in the coating gel-layer is weakened.

In such a case, however, since the strength of the coating gel-layer is deteriorated, when a hopper is used upon handling of the gel-coated seeds such as mechanical sowing, the gel-coated seed is crushed and deformed causing the hopper stuck and otherwise the surface layer of the gel-coated seed comes off causing the mechanical sowing unable to be carried out, that is, handling property thereof is deteriorated and the originally intended effect for the gel-coated seed cannot be attained.

Therefore, in order to attain sufficient strength of the coating gel-layer in such a condition that the using amount of the alginate is reduced, the amount of the hydrophilic polymer is significantly increased.

By this measure, the coating gel-layer having sufficient strength in usual use is obtained. However, when the coating gel-layer is dried for the purpose of storing the gel-coated seed and thereafter the coating gel-layer is provided with water for sowing the gel-coated seed, the coating gel-layer is not sufficiently recovered, that is, the coating gel-layer becomes spongy deteriorating its strength significantly and the gel-coated seed thus obtained becomes hard to be handled.

SUMMARY OF THE INVENTION

It is therefore an objective of the present invention to solve the above problem and to provide a gel-coated seed, which has sufficient strength for handling just after the production thereof and after the recovery following the storage under drying, and has a good property in terms of standing-up of seedling.

The inventor has carried out investigation on a starch polyacrylate-based hydrophilic polymer conventionally employed for attaining the objective described above. As a result, the inventor has found that when a hydrophilic polymer once contained water is dried and recovered by absorbing water, the hydrophilic polymer coming in contact with a multivalent metal ion (i.e., gelling agent) hardly absorbs water and hardly recovers, that is, upon absorbing water and recovering of the coating gel-layer of the gel-coated seed, only the three-dimensional network structure portion due to the alginic acid is recovered causing the coating gel-layer to be spongy, therefore the strength necessary for the coating gel-layer cannot be obtained.

In order to attain the above objective, the present invention is to provide a gel-coated seed comprising: a seed of a plant; a coating gel-layer, which coats the seed, consisting of alginic acid-based aqueous gel gelled in the presence of a multivalent metal ion; and grains consisting of water-containing hydrophilic polymer, which is resistant to the multivalent metal ion, distributed in the coating gel-layer.

With the construction described above, the gel-coated seed of the present invention significantly well recovers upon absorbing water after the storage under drying in comparison with a conventional gel-coated seed proposed in, for example, Japanese Patent Application Laid-Open No. H5-56707, even when the amount of the hydrophilic polymer is increased. Moreover, just after the production thereof and after the recovery following the storage under drying, the gel-coated seed of the present invention has sufficient strength for handling and a good property in terms of standing-up of seedling.

DESCRIPTION OF THE PREFERRED EMBODIMENTS

In the present invention, the multivalent metal ion, which forms the alginic acid-based aqueous gel, is a metal ion having a valence equal to or higher than two and is not a heavy metal ion. The multivalent metal ion is, for example, calcium ion, aluminum ion, and iron ion.

In the present invention, the hydrophilic polymer that is resistant to the multivalent metal ion means such a hydrophilic polymer that if the multivalent metal ion is, for example, a calcium ion, a hydrophilic polymer grain, which absorbs water in a sodium alginate aqueous solution of 0.9 wt % concentration so as to be granular, is immersed in a calcium chloride aqueous solution of 20 wt % concentration and taken out therefrom by filtration after one minute, wherein the weight change of the hydrophilic polymer is not more than 10%. Here, the weight change means a change in weight of the hydrophilic polymer, which is expressed by an absolute value, before and after the contact of the hydrophilic polymer with the calcium chloride aqueous solution.

If the weight change of the hydrophilic polymer is more than 10%, the recovery property of the gel-coated seed after the storage under drying is deteriorated and therefore, the effect of the present invention cannot be attained.

The hydrophilic polymer that is resistant to the multivalent metal ion is, for example, a sulfonic-based hydrophilic polymer, nonionic-based hydrophilic polymer, and carboxymethylcellulose-based hydrophilic polymer. Especially, a carboxymethylcellulose-based hydrophilic polymer is preferable since it is not toxic and is biodegradable, causing no problem in terms of the pollution of the environment.

Other than these hydrophilic polymers described above, for example, as for a starch polyacrylate-based hydrophilic polymer, hydrophilic groups in the polymer crosslink with each other by a calcium ion and therefore, the polymer shrinks and cannot absorb water again.

The calcium ion-resistant hydrophilic polymer is normally added thereto so that the concentration thereof becomes equal to 0.2 wt %. However, in order to attain a better property in terms of standing-up of seedling, the concentration thereof is preferably 0.5-0.8 wt %. As for the gel-coated seed of the present invention, even when the using amount of the hydrophilic polymer is increased as in the latter case, the gel-coated seed has high strength and excellent handling property just after the formation of the coating gel-layer, and such high strength and excellent handling property can be completely recovered by absorbing water after the storage under drying.

Further, when the using amount of the calcium ion-resistant hydrophilic polymer is set to be 0.5-0.8 wt %, tolerance of the concentration of the calcium chloride aqueous solution as the hardening liquid extends.

So far, strict control has been necessary for the concentration of the calcium chloride aqueous solution, which has been used for producing a conventional gel-coated seed (including a gel-coated seed, in which grains consisting of water-containing hydrophilic polymer are distributed in a coating gel-layer consisting of alginic acid-based aqueous gel).

That is, if the concentration of the calcium chloride aqueous solution is lower than 12 wt %, the strength of the gel-coated layer becomes too weak to handle, causing a problem that the mechanical sowing cannot be carried out. On the other hand, if the concentration of the calcium chloride aqueous solution is higher than 14 wt %, the gel-coated seed cannot recover sufficiently, and the bud hardly comes out from the coating gel-layer after the gel-coated seed germinates. This has been a reason why the concentration of the calcium chloride aqueous solution must be controlled in the narrow range of 12-14 wt %. This concentration gradually decreases as the manufacturing number of the gel-coated seed increases. Further, this concentration changes depending upon the vaporization of water. Thus, since the range of the concentration to be usable is very narrow, the concentration has to be controlled strictly even if the concentration is controlled by the density of the solution.

However, if the using amount of the calcium ion-resistant hydrophilic polymer is set to be 0.5-0.8 wt % upon formation of the aqueous gel-forming solution, the coating gel-layer having suitable hardness can be obtained when the concentration of the calcium chloride aqueous solution as the hardening liquid is 10-20 wt %. Thus, the usable concentration range of the calcium chloride aqueous solution becomes wider, especially at the high concentration side, as a result, the control of the concentration becomes easy to be carried out, thereby making the quality control easier.

The concentration of sodium alginate is set to be 0.9-1.3 wt % in the gel-forming solution, in which the grains consisting of water-containing hydrophilic polymer are dispersed.

When the using amount of the calcium ion-resistant hydrophilic polymer is set to be 0.5-0.8 wt %, the concentration of sodium alginate can be reduced to be 0.5-0.6 wt % in the gel-forming solution, by which the gel-coated seed to be obtained has an excellent property in terms of standing-up of seedling, and excellent strength and handling property just after the formation of the coating gel-layer and after the recovery by absorbing water following the storage under drying.

The gel-coated seed of the present invention can be produced in a similar manner to that of a conventional gel-coated seed except for a point that the kind of the hydrophilic polymer is different from that of the conventional gel-coated seed.

The gel-coated seed thus prepared can be stored by drying them for a long period of time so that they can be sown in a necessary place at a necessary time.

The drying is carried out at relatively low temperature, preferably at ordinary temperature, so that the seed is not damaged. However, if the drying takes a long period of time, the seed in the gel-coated seed may undesirably germinate. Therefore, the period of time for drying is preferably shortened by using ventilation. The gel-coated seed thus dried is stored at ordinary temperature or under cooling.

The coating gel-layer is recovered by immersing the gel-coated seed in water or by the other methods before sowing. It usually takes 3-16 hours to be recovered depending upon temperature and the thickness of the coating gel-layer.

In the recovery, the diameter of the gel-coated seed principally becomes uniform and the shape thereof recovers its spherical shape. If the recovered gel-coated seed is spherical having a diameter of 70-170 relatively to a diameter of 100 for the gel-coated seed before drying and the uniformity of the diameter among the gel-coated seeds is good, the gel-coated seed can be mechanically sown by replacing a grating of a sowing machine. In general, if the recovered gel-coated seed is too small in diameter, the bud cannot come out from the coating gel-layer because the gel-coated layer is hard, on the other hand, if the gel-coated seed is too large in diameter, the gel-coated seed is soft and does not have necessary strength, therefore they cannot be handled with a hopper.

EXAMPLES

In the following, the gel-coated seed of the present invention will be explained in detail with examples and comparative examples.

Comparative Example 1

Sodium alginate and powdered starch polyacrylate-based hydrophilic polymer (hereinafter, polymer A) were weighed so that each concentration in a solution became 0.9 wt % and 0.2 wt %, respectively and stirred well with adding water. The water-containing hydrophilic polymer grain dispersed in a gel-forming solution was observed with a microscope revealing that the diameter of the grain was 0.1-0.2 mm and the average diameter was 0.15 mm.

By using this dispersion solution, its droplet was formed at a lower end of a hollow tube, then a seed of a long onion was introduced into the droplet from the interior of the hollow tube and then, the droplet was dropped in calcium chloride aqueous solutions (hardening liquids) having the calcium chloride concentrations of 10, 12, 14, and 16 wt %, thereby preparing gel-coated seeds (189 seeds per each solution), in which grains consisting of water-containing hydrophilic polymer were distributed in a coating gel-layer consisting of alginic acid-based aqueous gel. The prepared gel-coated seed was approximately spherical having a diameter of about 1 cm (hereinafter, the same).

As for the gel-coated seed, which was prepared by using the hardening liquid of 10 wt % calcium chloride concentration, apparently had a soft coating gel-layer and could not be handled with a hopper. On the other hand, as for the gel-coated seed, which was prepared by using the hardening liquid of 16 wt % calcium chloride concentration, the coating gel-layer was too hard, therefore it was considered that the bud could not come out from the coating gel-layer.

Consequently, as for the gel-coated seeds, which were prepared by using the hardening liquids of 10 and 16 wt % calcium chloride concentration, the further investigation was not carried out.

The gel-coated seeds, which were prepared by using the hardening liquids of 12 and 14 wt % calcium chloride concentration, were once dried with ventilation and thereafter immersed in water at room temperature for 7 hours so as to recover the coating gel-layer.

At this time, each recovered gel-coated seed was spherical having weight of 120-148 relatively to weight of 100 for the gel-coated seed before drying and the uniformity among the gel-coated seeds was excellent. The recovered gel-coated seed was free from peeling of its surface and crack, and the diameter thereof was increased by only about 10% at most. (Hereinafter, the recovery of the level as described above is defined as "satisfactory".)

Further, the rupture stress (breaking stress) was measured and the result revealed that the recovered gel-coated seed was suitable to handling with a hopper and it appeared that the bud could come out from the coating gel-layer. Consequently, the ratio of standing-up of seedling was investigated.

Comparative Example 2

In order to improve the ratio of standing-up of seedling, the amount of the polymer A was increased compared with Comparative Example 1. That is, sodium alginate and the polymer A were weighed so that each concentration in a solution became 0.9 wt % and 0.8 wt %, respectively and stirred well with adding water. The water-containing hydrophilic polymer grain dispersed in a gel-forming solution was observed with a microscope revealing that the diameter of the grain was 0.1-0.2 mm and the average diameter was 0.15 mm.

Similarly to Comparative Example 1, by using this dispersion solution, its droplet was formed at a lower end of a hollow tube, then a seed of a long onion was introduced into the droplet from the interior of the hollow tube and then, the droplet was dropped in calcium chloride aqueous solutions (hardening liquids) having the calcium chloride concentrations of 10, 12, 14, and 16 wt %, thereby preparing gel-coated seeds (189 seeds per each solution), in which grains consisting of water-containing hydrophilic polymer were distributed in a coating gel-layer consisting of alginic acid-based aqueous gel.

Similarly to Comparative Example 1, the gel-coated seeds, which were prepared by using the hardening liquid of 10 and 16 wt % calcium chloride concentration, apparently were not suitable for use, therefore the further investigation was not carried out as to these gel-coated seeds.

The gel-coated seeds, which were prepared by using the hardening liquids of 12 and 14 wt % calcium chloride concentration, were once dried with ventilation and thereafter immersed in water at room temperature for 7 hours so as to recover the coating gel-layer.

However, the recovered coating gel-layer was spongy and therefore the gel-coated seed did not have strength large enough to be handled with a hopper or to be sown by using an automatic sowing machine. Consequently, the further investigation was not carried out as to these gel-coated seeds.

Example 1

An investigation was carried out using the same procedure as in Comparative Example 1 except for a point that a powdered carboxymethylcellulose-based hydrophilic polymer (hereinafter, polymer B) was employed instead of the polymer A. That is, sodium alginate and polymer B were weighed so that each concentration in a solution became 0.9 wt % and 0.2 wt %, respectively and stirred well with adding water. The water-containing hydrophilic polymer grain dispersed in a gel-forming solution was observed with a microscope revealing that the diameter of the grain was 0.1-0.2 mm and the average diameter was 0.15 mm.

The grain of the hydrophilic polymer B, which absorbed water in a sodium alginate aqueous solution of 0.9 wt % concentration so as to be granular, was immersed in a calcium chloride aqueous solution of 20 wt % concentration and taken out therefrom by filtration after one minute, then the weight change of the hydrophilic polymer was measured. The weight decreased by 5%.

By using this dispersion solution, its droplet was formed at a lower end of a hollow tube, then a seed of a long onion was introduced into the droplet from the interior of the hollow tube and then, the droplet was dropped in calcium chloride aqueous solutions (hardening liquids) having the calcium chloride concentrations of 10, 12, 14, and 16 wt %, thereby preparing gel-coated seeds (189 seeds per each solution), in which grains consisting of water-containing hydrophilic polymer were distributed in a coating gel-layer consisting of alginic acid-based aqueous gel.

As for each gel-coated seed thus prepared, the coating gel-layer had strength large enough to be handled and it appeared that the bud could come out from the coating gel-layer. Therefore, additional gel-coated seeds (112 seeds per each solution) were prepared similarly, in which the calcium chloride concentration was 8 and 20 wt %. As a result, the gel-coated seed of the calcium chloride concentration of 8 wt % was not suitable to be handled and therefore the further investigation was not carried out. On the other hand, the gel-coated seed of the calcium chloride concentration of 20 wt % was appeared to have sufficient strength to be handled in spite of its high hardness a little and its recovered condition by absorbing water after drying was appeared to be in a sufficient level, therefore its ratio of standing-up of seedling was investigated.

Example 2

An investigation was carried out using the same procedure as in Comparative Example 2 except for points that the polymer B was employed instead of the polymer A and that the calcium chloride concentrations of 8, 10, 12, 14, 16 and 20 wt % were used. The gel-coated seeds (112 seeds per each solution) were prepared. (The water-containing hydrophilic polymer grain dispersed in a gel-forming solution was observed with a microscope revealing that the diameter of the grain was 0.1-0.2 mm and the average diameter was 0.15 mm.)

The gel-coated seed of calcium chloride concentration of 8 wt % was not apparently suitable to be handled. Therefore, the other gel-coated seeds except it were subjected to the recovery by absorbing water after drying. As a result, each recovered condition was appeared to be in a sufficient level, therefore each ratio of standing-up of seedling was investigated.

Example 3

An investigation was carried out using the same procedure as in Example 2 except for a point that sodium alginate was weighed so that its concentration in a solution became 0.5 wt % instead of 0.9 wt %. The gel-coated seeds (112 seeds per each solution of the calcium chloride concentrations of 8, 10, 12, 14, 16 and 20 wt %) were prepared. (The water-containing hydrophilic polymer grain dispersed in a gel-forming solution was observed with a microscope revealing that the diameter of the grain was 0.1-0.2 mm and the average diameter was 0.15 mm.)

The gel-coated seed of calcium chloride concentration of 8 wt % was not apparently suitable to be handled. Therefore, the other gel-coated seeds except it were subjected to the recovery by absorbing water after drying. As a result, each recovered condition was appeared to be in a sufficient level, therefore each ratio of standing-up of seedling was investigated.

Comparative Example 3

Further, gel-coated seeds were prepared in such a manner that sodium alginate was weighed so that its concentration in a solution became 0.5 wt %, and the concentration of the polymer A dispersed in the solution became the same (0.8 wt %) as that of Comparative Example 2.

As a result, the gel-coated seed having sufficient hardness high enough to be handled was not obtained for each solution of the calcium chloride concentrations of 8-20 wt %. Consequently, the further investigation was not carried out as to these gel-coated seeds.

(Investigation on Ratio of Standing-Up of Seedling)

The ratio of standing-up of seedling was investigated as to the gel-coated seed (gel-coated seed of a long onion), in which the grains consisting of the water-containing hydrophilic polymer are distributed in the coating gel-layer consisting of alginic acid-based aqueous gel. The result is shown in Table 1.

TABLE 1

| | Hydrophilic Polymer | Concentration of sodium alginate (wt %) | Concentration of hardening liquid (wt %) | Ratio of standing-up of seedling (%) |
|---|---|---|---|---|
| Comparative Example 1 | A | 0.9 | 12 | 61.6 |
| | | | 14 | 58.0 |
| Example 1 | B | 0.9 | 10 | 62.5 |
| | | | 12 | 60.7 |
| | | | 14 | 61.6 |
| | | | 16 | 58.9 |
| | | | 20 | 54.5 |
| Example 2 | B | 0.9 | 10 | 63.4 |
| | | | 12 | 63.4 |
| | | | 14 | 61.6 |
| | | | 16 | 61.6 |
| | | | 20 | 59.8 |
| Example 3 | B | 0.5 | 10 | 86.6 |
| | | | 12 | 88.4 |
| | | | 14 | 89.3 |
| | | | 16 | 87.5 |
| | | | 20 | 88.4 |

The examples and comparative examples described above reveal that as for the gel-coated seed of the present invention, the coating gel-layer can be completely recovered after the storage under drying even when the amount of the hydrophilic polymer is increased, and the ratio of standing-up of seedling can be significantly improved by reducing the concentration of alginic acid. Moreover, the gel-coated seed of the present invention is significantly advantageous in controlling the production of the gel-coated seed because the tolerance range of the concentration of the hardening liquid can be broad, whereas a very strict control of the concentration has been needed conventionally. Furthermore, the gel-coated seed of the present invention can be precisely sown by mechanical sowing.

The aforementioned preferred embodiments are described to aid in understanding the present invention and variations may be made by one skilled in the art without departing from the spirit and scope of the present invention.

What is claimed is:

1. A gel-coated seed comprising:
   a seed of a plant; and
   a coating layer disposed on the seed, said coating layer produced by (i) applying an alginic acid-based gel-forming solution containing grains of carboxymethylcellulose-based water-containing hydrophilic polymer dispersed therein to the seed, and (ii) gelling the alginic acid-based gel-forming solution in the presence of a gelling agent of a multivalent metal ion, so that the coating layer that is formed on the seed comprises the grains of the carboxymethylcellulose-based water-containing hydrophilic polymer distributed therein, wherein the concentration of the hydrophilic polymer in the gel-forming solution is between 0.2% by weight and 0.8% by weight whereby the resulting gel-coated seed has sufficient strength for handling and enhanced seedling survival both immediately after production thereof and after recovery following storage under drying.

2. The gel-coated seed according to claim 1, wherein the multivalent metal ion is a calcium ion.

3. A method for forming a coating layer on a seed of a plant which method comprises the steps of:
   (i) applying an alginic acid-based gel-forming solution containing grains of carboxymethylcellulose-based water-containing hydrophilic polymer dispersed therein to the seed, wherein the hydrophilic polymer is used such that the concentration of the hydrophilic polymer in the gel-forming solution is between 0.2% by weight and 0.8% by weight, and (ii) gelling the alginic acid-based gel-forming solution in the presence of a gelling agent of a multivalent metal ion so t hat the coating layer that is formed on the seed comprises the grains of the carboxymethylcellulose-based water-containing hydrophilic polymer distributed therein.

* * * * *